July 20, 1965  A. WEILAND  3,195,297
SIDE GUARD FOR A ROTARY DISK LAWN MOWER
Filed Sept. 3, 1964  3 Sheets-Sheet 1

INVENTOR.
ALFRED WEILAND
BY
ATTORNEY

INVENTOR.
ALFRED WEILAND
BY *Leo Edelson*

ATTORNEY

July 20, 1965 A. WEILAND 3,195,297
SIDE GUARD FOR A ROTARY DISK LAWN MOWER
Filed Sept. 3, 1964 3 Sheets-Sheet 3
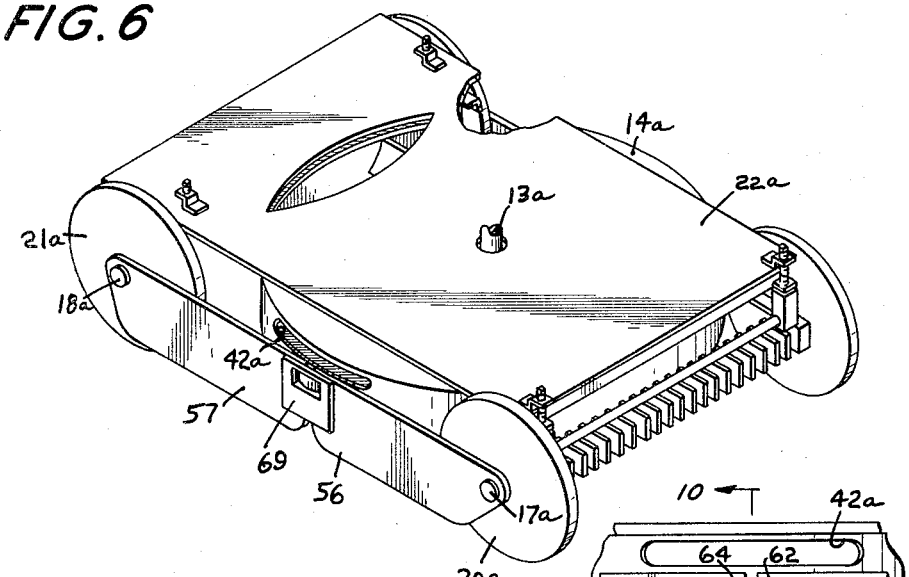
FIG. 6
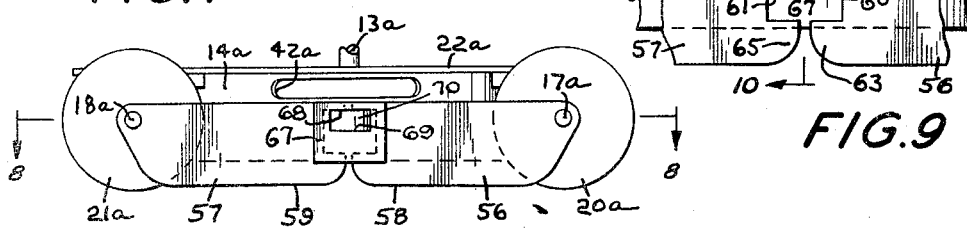
FIG. 7
FIG. 9
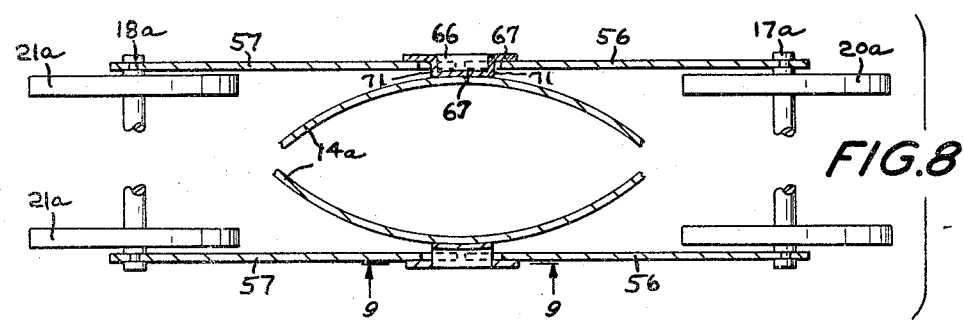
FIG. 8
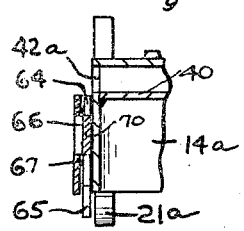
FIG. 10
INVENTOR
ALFRED WEILAND
BY
ATTORNEY

United States Patent Office 3,195,297
Patented July 20, 1965

3,195,297
SIDE GUARD FOR A ROTARY DISK
LAWN MOWER
Alfred Weiland, 200 Haven St., Clearwater, Fla.
Filed Sept. 3, 1964, Ser. No. 394,170
3 Claims. (Cl. 56—25.4)

The present invention relates to a lawn care unit and more particularly to a more efficient and safe blade mower wherein the collection of grass cuttings, leaves and debris on lawns, walks and roadways are more efficiently carried out, this application being a continuation-in-part of my co-pending application, Serial No. 166,314, filed January 13, 1962, maturing as Patent No. 3,188,787, dated June 15, 1965.

It is among the objects of this invention to provide an improved safe rotary blade mower to operate in association with a collector such as shown in Patent No. 3,006,128 but differing therefrom for a correlated result not heretofore attained.

Another object is to provide an improved rotary blade mower wherein the collection of wet cuttings at the entrance to the discharge pass are prevented by being automatically removed.

Another object is to provide a rotary blade mower wherein novel guards protect the operator, a bystander or adjacent property from accidental contact with the blade and from flying debris from the mower housing and also to reduce the escape of air, cuttings and mulch from under the housing.

Yet another object of the invention is to provide a novel rotary blade mower as aforesaid in which the side guard structure is so arranged that an improved sweeping or gathering action is provided for the efficient collection of grass cuttings, leaves and the like resulting in a very clean lawn requiring no follow-up raking.

A further object is to provide a rotary blade mower wherein supplemental air is supplied above the blade to reduce the suction on the grass and thereby reduce the power required to push the mower increasing the efficiency of the impeller action of the blade.

A still further object is to provide a novel baffle assembly wherein the air pressure at the cuttings discharge passage into the collecting receptacle is increased to thereby counteract the whirling action of the air return.

Other objects will appear hereinafter.

In the accompanying drawings:

FIG. 6 is an isometric view of the chassis of another form of the invention showing a modified side links or guard structure;

FIG. 7 is a side elevational view of the form of the invention shown in FIG. 6;

FIG. 8 is an enlarged horizontal sectional view of the side guard structure portion of the invention embodiment shown in FIG. 6 as would be seen when viewed along the line 8—8 of FIG. 7;

FIG. 9 is an enlarged fragmentary side elevational view of the freely vertically shiftable inner ends of the side guard as would be seen when viewed in the plane designated by the lines 9—9 of FIG. 8; and FIG. 10 is a vertical sectional view through the support structure for the side guards inner ends as would be seen when viewed along the line 10—10 of FIGURE 9.

In the several figures, like elements are denoted by like reference characters.

Figure 1:
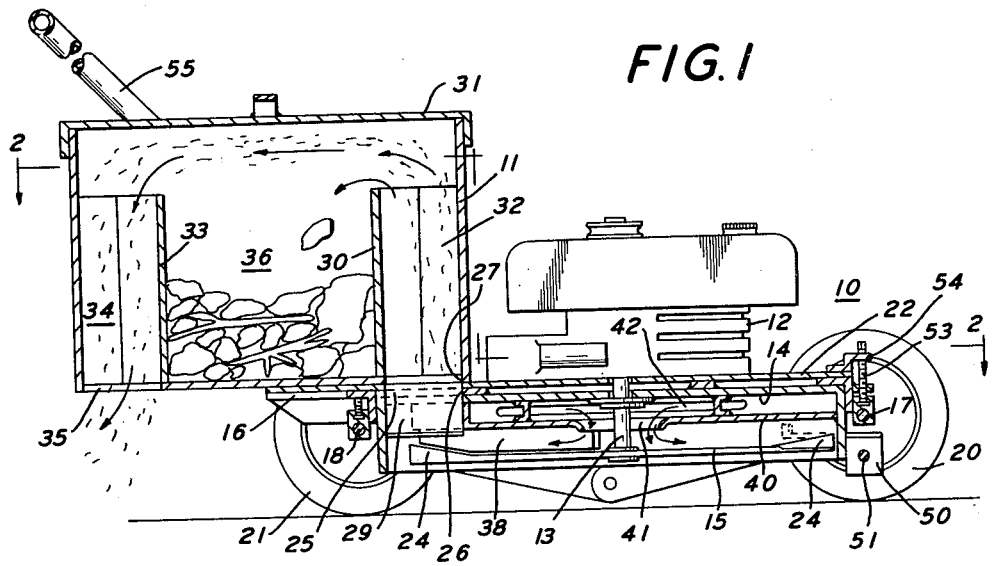
FIG. 1 is a medial sectional elevation view of a lawn care unit embodying one form of the invention, said figure being taken along the line 1—1 of FIG. 2 with the engine, however, shown in side elevation.

Referring to the drawings the unit of the invention comprises the combination of a rotary power mower 10 and a receptacle 11 for collecting and sorting material as discharged from the mower. The mower 10 includes a conventional gas engine 12 having a shaft 13 projecting vertically downward into an open bottom cylindrical housing 14 to drive the grass cutting blade 15, which blade also functions within said housing as an air blower as will be apparent hereinafter. The housing 14 is carried by two spaced apart angle bars 16 extending between and end supported by axles 17 and 18 which serve respectively as journals for front and rear wheels 20 and 21. That portion of each angle bar lying between the opposite sides of the housing rim has its depending flange cut-off in order not to interfere with air flow as will hereinafter be described. A cover plate 22 overlies the top of the housing 14 to seat the motor 12 while also serving as a support for the receptacle 11. The plate 22 is provided with openings respectively for the passage of the shaft 13 and other parts below the plate.

The blade 15 is preferably a steel strip with sharpened cutting edges and is connected at its center to the shaft 13, while terminating at its end respectively in upstanding angularly disposed impellers 24 to increase the efficiency of the blower for discharge of the cuttings into the receptacle 11.

As a discarge from the interior of the housing an arcuate slot 25 is cut in the top of the housing to form with the housing rim an outlet of substantially elliptical contour disposed above the path of travel of the blade 15. The margin 26 of the slot 25 is generated on a radius having the center of the receptacle as its center while the rim margin is generated on a radius about a center offset from the shaft 13. Both centers are on the median line of the unit. When the receptacle is in operative position, it will be seated upon the plate 22 over the slot 25 with its wall coincident with the aforesaid margin 26.

In order to establish free discharge of cuttings into the receptacle a slot 27 is formed in the bottom of the receptacle of the same size and shape as the slot 25 and is located to form a continuation of the slot 25. Also the plate 22 has a slot of the same size and shape as the slot 27 and positioned to coincide therewith and thus complete free communication between the housing 14 and the receptacle 11.

For association with the rotary blade mower the receptacle 11 is an open top cylindrical body having a partition 30 rising from the bottom to terminate in spaced relation to a cover 31 over the open end. The partition 30 has an arcuate contour to form, with the wall of the receptacle, an elliptical passage 32 leading from the bottom inlet slot 27 as a mating continuation thereof.

Also there is a second partition 33 rising from the receptacle bottom at the opposite end thereof and terminating in spaced relation to the cover 31. This partition 33 has an arcuate contour to form, with the wall of the receptacle, an elliptical passage 34 which communicates at the bottom with an elliptical discharge slot 35 in such bottom. Thus the two partitions form a chamber 36 therebetween which communicates with the path of discharging material through the passages 32 and 34. By this assembly heavy cuttings and debris drop by gravity into the chamber 36 while the light fines travel down the passage 34 to discharge upon the ground as a mulch. Generally considered this interior assembly resembles that of applicant's patent 3,006,128 but differs materially therefrom in its functional operation to give the desired new result, namely, automatic removal of wet cuttings by the sweep of the cutter blade through the inlet to passage 32.

As a means to effectively guide the cuttings from the blade discharge into the outlet 25, a chute 29 is welded or otherwise made fast to the housing 14 in an inclined position below the outlet 25. The upper end of the chute 29 projects partly through the outlet 25 and the receptacle slot 27 to thereby create a suction action on the order of a nozzle.

As a means to improve the efficiency of the fan and increase the pressure within the housing 14, a baffle 38 is mounted in the housing to extend radially from the housing center to the housing wall. The vertical width of this baffle is such that its lower edge lies in a plane in relatively close proximity to the path of the cutting blade 15. Thus any cuttings improperly carried by the blade are swept off and redirected to the discharge slot instead of travelling around and around to cause clogging. With reference to the travel of the blade 15, it should be noted that the off-center radius relation gives the blade 15 a path of travel under the discharge outlet 25 at one side of the housing and just out of contact with the housing wall at the other side. This construction lessens the danger of clogging. Further the added spacing of the blade from the outer margin of the slot 25 creates more clearance at the discharge outlet under the receptacle. If the quantity of grass delivered by the blade 15 exceeds the capacity of the outlet passage when the mower travels through exceptionally high or thick grass and leaves, this material falls back on the cutter blade when the cutting is reduced to normal by reducing the forward travel speed of the mower.

In order to increase the flow of air through the housing a circular baffle plate 40 is positioned within the housing in spaced relation to its top and having a center aperture 41 encircling the axis of the blade. Such plate 40 is anchored by welding to the inner wall of the housing rim. That portion of the disc 40 adjacent the discharge passage is cut away to form an arcuate flange 39 to mate the curvature of the outlet 25. Opposite sides of the housing wall are each provided with an inlet slot 42 to direct air into the space above the plate 40 and then through the aperture 41 in response to blade suction. Also the baffle plate 40 serves to stiffen the deck and wall of the housing and prevent flutter of the blade and noisy vibrations as well as loosening of connected parts.

In order to prevent users of the mower, or others, from injury due to their feet or hands getting into the path of the rotating blade, as well as to prevent broken blades and debris from flying laterally out of the housing to cause damage, each side of the carriage is provided with a pair of flat links 43 and 44, the former 43 being pivoted to the axle 17, and the latter pivoted to the axle 18. The free ends of the two links overlap medially of the carriage and are pivotally connected together by a bolt 45 traversing holes in the respective links, such connection including a slot 46 as the hole in the link 18, whereby a lost motion makes possible the rise fall of the links in response to variations in the ground level. The length of the links is such that normally they are suspended as a guard terminating in close proximity to the ground while closing the space between the bottom of the housing and the ground. Preferably a spring 47 is medially attached to the housing so that its free ends bear respectively upon the top edges of the links to thereby give a steadying action as the links rise and fall over ground undulations.

As a further means to protect the user from injury by the blade as well as to prevent forward discharge of cuttings and debris from the mower, the front end of the mower is provided with a guard depending a predetermined distance from the housing 14, to enter below the top level of the grass, such guard being in the form of a row of relatively flat steel discs 50 carried by a transverse rod 51 connected by brackets 52 projecting from housing 14. Alternatively, in lieu of the discs 50 there may be employed flat steel plates which are normally disposed in the vertical plane of the front wheel axle to extend across the front of the mower to prevent frontwise discharge of cuttings and debris as well as to reduce the escape of air forwardly of the mower, which plates are preferably so pivotally mounted upon the shaft 51 (or the front wheel axle 17) that they swing back and over an obstruction in the path of travel of the mower.

The respective wheel axles 17 and 18 are carried by bolts 53 in threaded engagement with brackets 54 attached to the cover plate 22 for adjustment purposes.

A handle 55 is attached to the rear portion of the plate 22 and is of U-shape to straddle the receptacle 11 when the latter is in collecting position. This handle serves as a manual means for pushing the mower or as a guiding means when it is self-propelled.

It will now be apparent that a novel rotary blade mower has been devised which is not only an efficient grass cutter but also operates to limit the collection of wet cuttings at the discharge of the housing. Furthermore the mower of the invention includes the use of a supplemental supply of air which discharges above the blades to coact with the impeller action for more efficient operation.

The partition or plate 40, by which the supplemental air is delivered above the blade is rigidly connected to the housing to make a smooth surface uninterrupted by motor mounting bolts. Also this plate 40 makes it possible to use lighter metal in the housing while assuring a very stiff structure resisting engine vibration with resulting blade flutter.

Also a baffle is located in the blade housing and so positioned with respect to the path of travel of the blade that cuttings otherwise carried around and around are swept from the blades and fall directly into the path of the discharge and thence to the entrance of the collecting receptacle.

Attention is particularly directed to the side guards depending from the mower frame over the space between the housing and the ground as a protection against injury by the blade. These guards are self-adjusting to compensate for undulations of the lawn.

Figure 2:
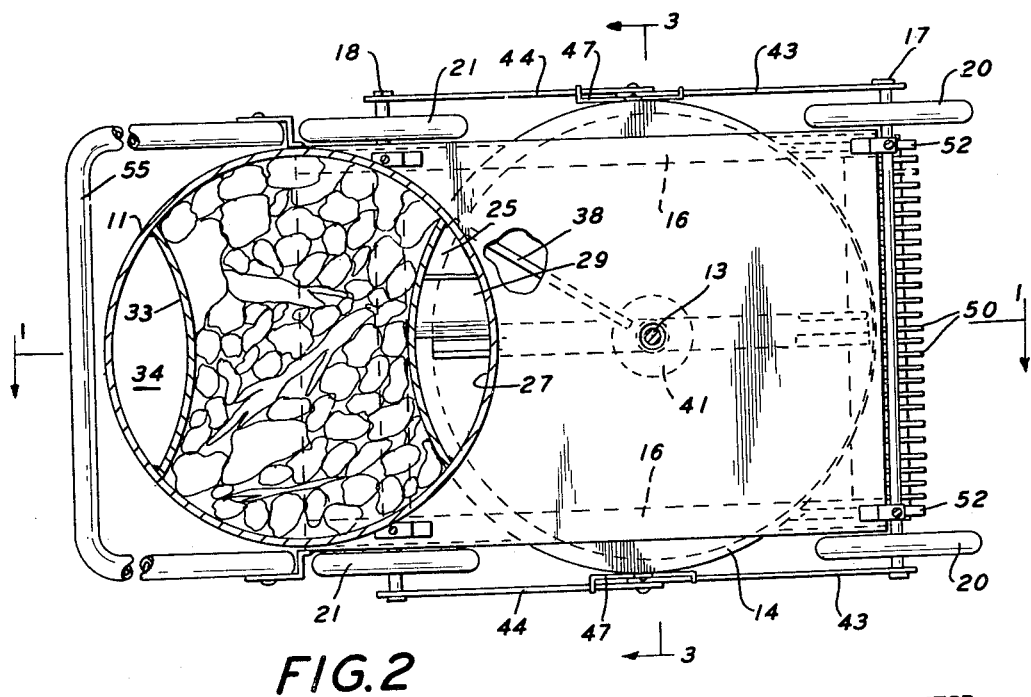
FIG. 2 is a section view on lines 2—2 of FIG. 1 with certain parts omitted for purpose of clarity.
Figure 3:
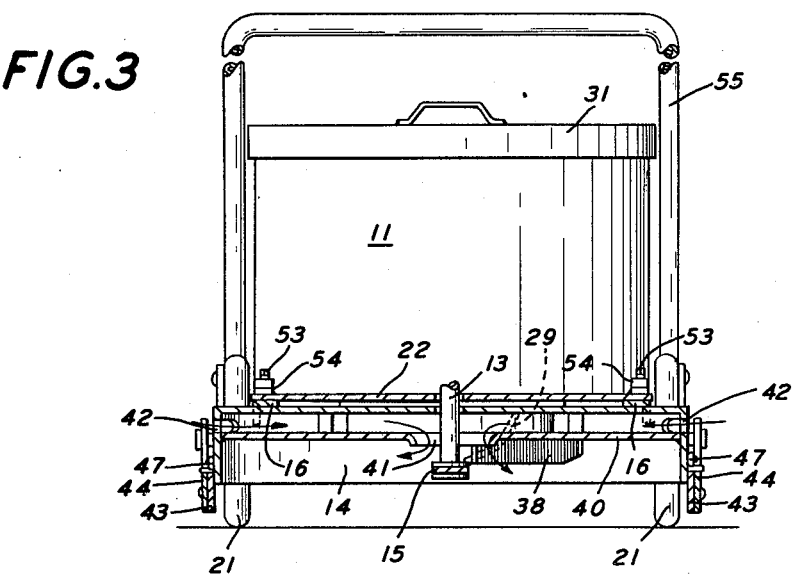
FIG. 3 is a section view on line 3—3 of FIG. 2.
Figure 4:
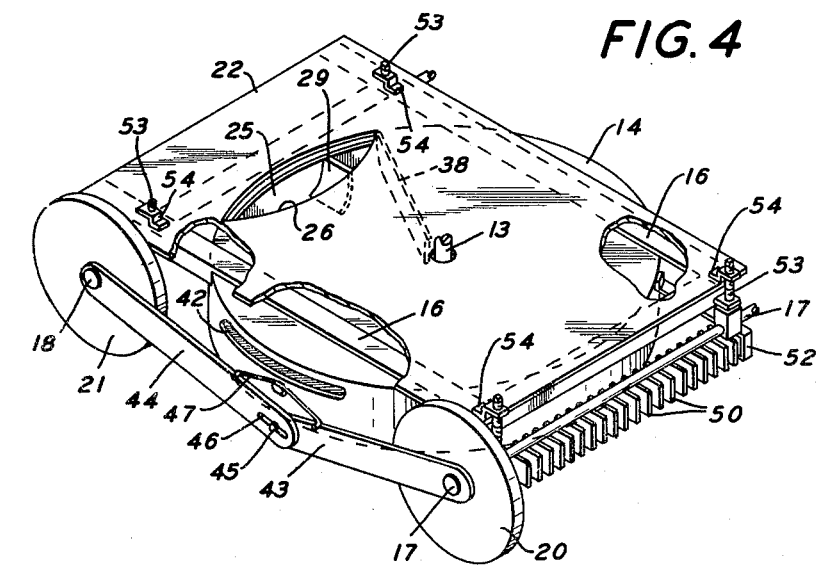
FIG. 4 is an isometric view of the chassis partly broken away.
Figure 5:
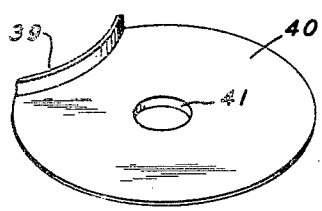
FIGURE 5 is an isometric view of the baffle plate for guiding air into the mower housing.

A modified form of the invention is shown in FIGURES 6 through 10 which illustrate a side guard construction arranged to provide an improved sweeping action for the more efficient collection of grass cuttings and leaves which restricts the lateral throw of such cuttings substantially to the width of the mower housing and thereby produces a very clean lawn which requires no follow-up raking. The mower structure itself which is illustrated in FIGURES 6 through 10, except for the side guard modification, is the same as that already described in connection with the showings of FIGURES 1 through 5, similar parts being designated in FIGURES 6 through 10 by the same reference characters followed by the small letter "a." Thus, there is observed the engine drive shaft 13a, cylindrical housing 14a, front and rear axles 17a and 18a respectively which carry the front and rear wheels 20a and 21a respectively, the housing cover plate 22a and the housing air inlet side slots 42a.

Each side of the mower carriage is provided with generally rectangular front flat plate side guards 56 pivoted at their forward ends to the front axle 17a, and generally rectangular rear flat plate side guards 57 pivoted at their rear ends to the rear axle 18a. As best seen in FIGURE 7, the lower corners of the side guards 56 and 57 are smoothly rounded so that there is no tendency for these guards to dig into uneven terrain over which the mower may be passing due to the fact that the front to rear extending lower edges 58 and 59 respectively of the side guards 56 and 57 are closely spaced above ground level without a great deal of clearance. The side guards 56 and 57 are thus observed to penetrate substantially downward into the grass being cut and provide a closure extending substantially downward below the bottom edge of the skirt of the cylindrical housing 14a.

As best seen in the showing of FIGURE 9, the facing proximate ends of the front and rear side guards 56 and 57 are rectangularly cut-out as at 60 and 61 respectively to provide at the rear end of the front guard 56 rearwardly projecting upper and lower arms 62 and 63 while similarly providing at the forward end of the rear guard 57 forwardly projecting upper and lower arms 64 and 65.

The upper arms 62 and 64 of the side guards 56 and 57 respectively rest freely upon a bracket 66 suitably secured, as by welding, to the curved side wall of the cylindrical housing 14a. As most clearly appears in FIGURES 8 to 10, this bracket includes a plate 67 which is disposed outwardly of the proximate inner ends of the side guards 56 and 57 and in overlying relation thereto to restrain said guards against movement laterally away from the side wall of the housing 14a. The plate 67 is itself lanced, as at 68 and 69 (FIGURE 7) and formed to provide the same with a U-shaped rearwardly projecting portion having a base wall 70 which is curved to the contour of and is secured flatwise, as by welding to the housing side wall and with a pair of laterally spaced side legs 71—71 the upper edges of which respectively serve as supports for the upper arms of the side guards 56 and 57. Thus, the side guards 56 and 57, while free to shift vertically in a common vertical plane about their respective pivots 17a and 18a, are captured by the bracket 66 between the side wall of the housing 14a and the outer plate 67 of the bracket and so restrained from lateral displacement out of their common plane of permissible movement.

As is also most clearly seen in FIGURES 9 and 10, a substantial vertical clearance exists between the side guards lower arms 63 and 65 on the one hand and the bottom edges of the bracket side legs 71—71 on the other hand, so that the proximate ends of the side guards 56 and 57 are free to move vertically upward behind the plate 67 when the under surfaces of the side guards encounter bumps or hills in the terrain over which the mower is being moved, the outer ends of the side guards of course pivoting about the front and rear axles 17a and 18a respectively. The side guards 56 and 57, as compared to the side guards 43 and 44, not only provide confinement of cuttings to the width of the mower, but also provide a more effective mechanical barrier against missile projection by the mower of stones and other hard objects coming within the confines of the housing since the vertical closure provided by the side guards 56 and 57 is substantially complete.

In the lawn care unit of the present invention, the cuttings are discharged at the back of the mower and are confined within its width by means of the side plates 56 and 57 which are of a depth sufficient to penetrate into the grass being cut and at the same time provide an effective barrier against side-wise discharge and escape of cuttings and leaves, this being accomplished without requiring any increase in the power necessary for motor propulsion of the mower.

In the normal operation of the mower of the present invention the developed air pressure for delivery of the cuttings to the receptacle is of relatively low order sufficient to convey light cuttings directly to the receptacle. But, even this low pressure coupled with the centrifugal force of the rotating blade may be sufficient to propel heaver debris at high velocity a considerable distance from the mower. Such undesired and dangerous high velocity lateral projection of heavy objects is not only effectively precluded by the side plates 56 and 57, but the latter also serve under extremely heavy cutting operation of the mower to accumulate cuttings against the inner surfaces of the side plates to thereby build up a barrier wall of such cuttings around the circle of rotation of the cutter which acts to increase the pressure of the air to and through the chute leading from the housing to the receptacle for the cuttings, which pressure is then effective to force flow even the heavier cuttings into the receptacle at the rear of the mower.

In the foregoing specification and accompanying drawings I have illustrated my improved lawn mower unit in the preferred form but it will be understood that the invention is not limited to the particular structure therein disclosed except insofar as covered by the claims.

What is claimed as new and useful is:

1. A lawn care unit comprising a rotary power mower including a vertically extending shaft, a cutting blade attached to said shaft, impelling means on said cutting blade, enclosure for said cutting blade having air entrance and discharge parts, said enclosure including an open-bottomed cylindrical housing and paired coplanar side plates arranged upon opposite sides of said housing in vertical planes substantially parallel to the direction of travel of the mower, said paired side plates being disposed in end to end alinement with their outer ends pivotally supported for conjoint swinging movement in said vertical planes, and means intervening the inner ends of each pair of said side plates for limiting their conjoint swinging movement relatively to the ground, said plates being of substantial vertical depth to confine the cuttings of said mower within the widthwise expanse of the mower and being free to move relatively to the enclosure for the cutting blade in correspondence with the undulating surface of the ground traversed by the mower.

2. A lawn care unit as defined in claim 1 wherein said intervening means comprises a bracket fixedly secured to a side of the blade housing in intervening relation to the proximate ends of each pair of side plates, said bracket including stops for limiting downward movement of said ends of the side plates and a face plate spaced outwardly from blade housing to restrict lateral displacement of the plates relatively to said housing.

3. A lawn care unit as defined in claim 1 wherein said paired side plates are of a vertical depth and have a limited freedom of movement in their respective planes to penetrate the ground material being acted upon by the cutter and ride along the undulating surface of the ground traversed by the mower.

References Cited by the Examiner

UNITED STATES PATENTS 2,523,640  9/50  Zipf _____ 56—25.4
2,806,339  9/57  Whitney _____ 56—25.4

ABRAHAM G. STONE, *Primary Examiner.*

ANTONIO F. GUIDA, *Examiner.*